June 18, 1940.  W. SCHAELCHLIN  2,205,220

LIQUID RHEOSTAT AND SLIP REGULATOR

Filed Jan. 3, 1938  2 Sheets-Sheet 1

WITNESSES:
C. J. Weller.
F. V. Giolma

INVENTOR
Walter Schaelchlin.
BY
W. R. Coley
ATTORNEY

June 18, 1940.  W. SCHAELCHLIN  2,205,220

LIQUID RHEOSTAT AND SLIP REGULATOR

Filed Jan. 3, 1938  2 Sheets-Sheet 2

WITNESSES:
C. J. Weller.
F. V. Giolma

INVENTOR
Walter Schaelchlin.
BY
W. R. Coley
ATTORNEY

Patented June 18, 1940

2,205,220

UNITED STATES PATENT OFFICE 2,205,220

LIQUID RHEOSTAT AND SLIP REGULATOR

Walter Schaelchlin, Wilkinsburg, Pa., assignor to Westinghouse Electric & Manufacturing Company, East Pittsburgh, Pa., a corporation of Pennsylvania Application January 3, 1938, Serial No. 183,239

5 Claims. (Cl. 201—57)

My invention relates generally to rheostats, and it has particular reference to liquid containing rheostats and slip regulators.

It has heretofore been found that rheostats and regulators of the liquid type are particularly desirable for controlling large polyphase wound rotor motors, because of their capability of dissipating the large amounts of heat that are generated in controlling motors of this type and in providing for smooth and gradual changes in resistance. In the usual form of construction, rheostats and regulators of the liquid type generally comprise a common electrolyte container for accommodating a plurality of phase groups of electrodes, the different phase groups being sufficiently spaced from one another to more or less minimize leakage between phases. In order to vary the resistance, either the surface area of the electrodes immersed in the electrolyte is varied by moving the electrodes in or out of the electrolyte or the level of the electrolyte in the container is varied, or else the distance between the electrodes of each phase group is varied by a relative movement of the electrodes in the electrolyte. Where the electrodes of all phases are contained in a common tank, it may be seen that there will, of necessity, be leakage between different phase groups of electrodes, thus limiting the upper range of resistance which may be effectively obtained with such construction. Similarly, where the electrodes of any one phase group are merely suspended in an open tank of electrolyte, it is difficult to secure satisfactory alignment of them or circulation of electrolyte between them when they are in close relation, and boiling of the electrolyte often occurs through the formation of local hot spots on the faces of the electrodes when the distance between them is reduced below a given value. This necessarily limits the practical proximity of the electrodes, and prevents the resistance between the electrodes from being reduced below a definite value, so that it is then necessary to provide some additional means for further lowering the resistance, such as, for example, a second set of electrodes connected in parallel, or other auxiliary control equipment.

Furthermore, where a common containing tank is used for the electrolyte, it is necessary to maintain a certain distance between the electrodes of the different phases in order to prevent excessive leakage of current or sparking between phase groups, and thus the dimensions of the container may not be reduced below certain predetermined limits, which are dependent primarily on the voltage between phases and not on the amount of power being controlled. This means that in many instances where a relatively high voltage occurs between the phase groups, the container must be excessively large in order to provide the necessary clearances between phase groups, and a much greater amount of electrolyte must be used than is really necessary. This not only increases the expense of maintaining the equipment, but it also greatly increases the weight and the amount of floor space required. Moreover, whenever it is found necessary to make repairs concerning any one phase of the rheostat, it is usually necessary to drain the entire tank, thus making such repair a costly and a laborious operation.

It is, therefore, generally an object of my invention to increase the range of resistance variation obtainable in a polyphase liquid rheostat and slip regulator.

A more specific object of my invention is to provide a liquid slip regulator having a plurality of segregated phase units for use with a polyphase power system.

Another object of my invention is to provide a system of electrolyte distribution in a polyphase liquid slip regulator which will require a minimum of electrolyte and effect a reduction in weight and floor space.

A further object of my invention is to provide for utilizing a plurality of segregated phase units connected by an electrolyte manifold for effecting a wide range of resistance variation in a polyphase liquid slip regulator or rheostat.

A still further object of my invention is to provide a polyphase liquid slip regulator having a connecting electrolyte manifold for securing a directed flow of electrolyte between the electrode surfaces.

Another object of my invention is to effect an efficient flow of electrolyte between closely spaced relatively movable electrodes in a liquid slip regulator to minimize heating of the electrodes and electrolyte.

An additional object of my invention is to provide smooth variation in resistance over a wide range of values in a liquid rheostat and slip regulator.

A still further object of my invention is to provide a liquid rheostat and slip regulator for use with polyphase power systems that shall be simple and inexpensive to manufacture and economical and effective in operation.

Other objects will, in part, be obvious, and will, in part, appear hereinafter.

For a more complete understanding of the nature and scope of my invention, reference may be had to the following detailed description, taken in connection with the accompanying drawings, in which.

Figure 1:
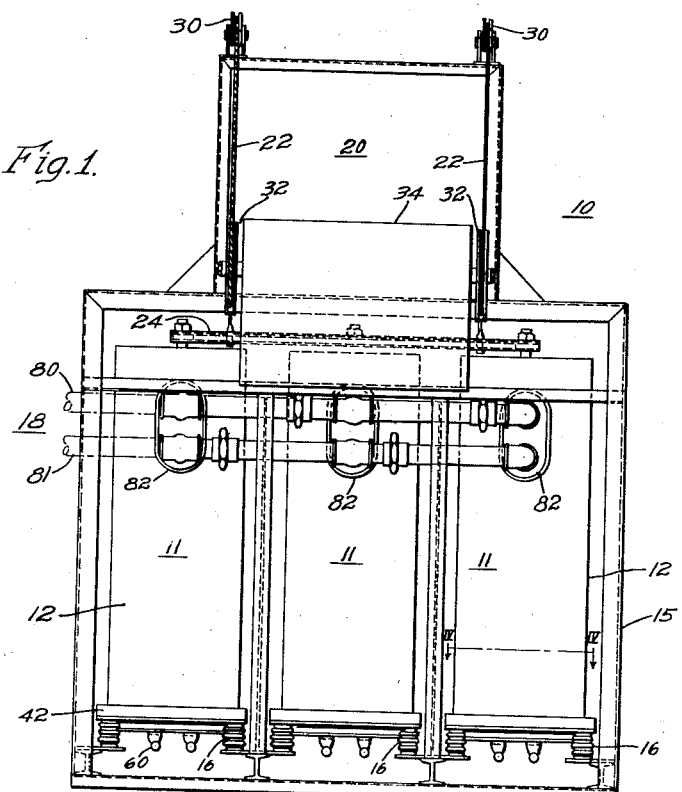
Figure 1 is a side elevation view of a preferred form of polyphase liquid rheostat embodying the principal features of my invention.
Figure 2:
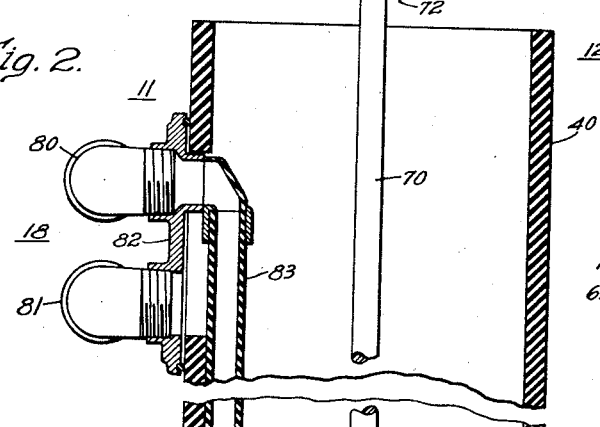
Fig. 2 is an enlarged elevation view in section of one of the phase units of the rheostat of Fig. 1.
Figure 3:
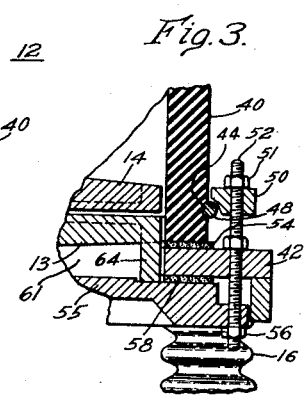
Fig. 3 is an enlarged sectional view of the pressure ring and key ring assembly of Fig. 2.

Referring generally to Figs. 1 and 2, the reference numeral 10 denotes, generally, a polyphase liquid rheostat or slip regulator embodying a preferred form of my invention, wherein separate phase units 11, each comprising a container 12, having a fixed electrode 13 and a movable electrode 14 disposed therein, may be separately supported in a frame 15, being, for example, mounted upon insulators 16 in the manner shown, and having an electrolyte manifold 18 for connecting the containers so as to provide for the circulation of electrolyte therethrough. As shown, electrode controlling means 20 may be provided in connection with the movable electrodes 14 of the separate phase units for effecting adjustment thereof. For example, the movable electrodes 14 may be suspended from a common support member 24 which is disposed to be raised or lowered by means of control cables 22 secured thereto. In order to effect movement of the electrodes 14, these cables pass over guide pulleys 30 and are secured to the hoist drums 32, which may be driven in any well known manner by a motor (not shown) enclosed within a waterproof housing 34.

Referring particularly to Fig. 2, it may be seen that in practicing my invention, I prefer to utilize as a body member for a container 12, an insulating tube 40, which may, for example, comprise a standard section of impregnated concrete pipe, or the like. In order to provide a container structure which is not only leakproof, but which is easy to assemble and repair, I prefer to support the tube 40 by a base plate 42, which has an opening therein of substantially the same dimensions as the inner dimensions of the tube 40 and to which the insulator supports 16 are secured. In order to facilitate securing the tube 40 to the base plate 42, a groove 44 may be provided around the circumference of the tube 40, adjacent to the end thereof, in which a key ring 48 may be seated. A pressure ring 50, which is adapted to fit loosely around the outside of the tube and which has a beveled edge on its inner face for engaging the key ring 48, may be brought to bear against the key ring 48 by means such as the nuts 51 and stud bolts 52, and thus draw the end of the tube 40 against the base plate 42, compressing the gasket ring 54 which is disposed therebetween, to provide a leakproof joint. By providing a pan member 55, adapted to be drawn against the lower side of the base plate 42 by tightening nuts 56 on the bolts 52 and compressing a gasket 58 which is disposed therebetween, it may be seen that an electrolyte container may be provided which is easily assembled, and which may yet be readily either completely or partly disassembled for the purpose of making repairs. Furthermore, the joints, being entirely open, are readily inspected, and any leaks may be found and remedied before any damage results.

Figure 4:
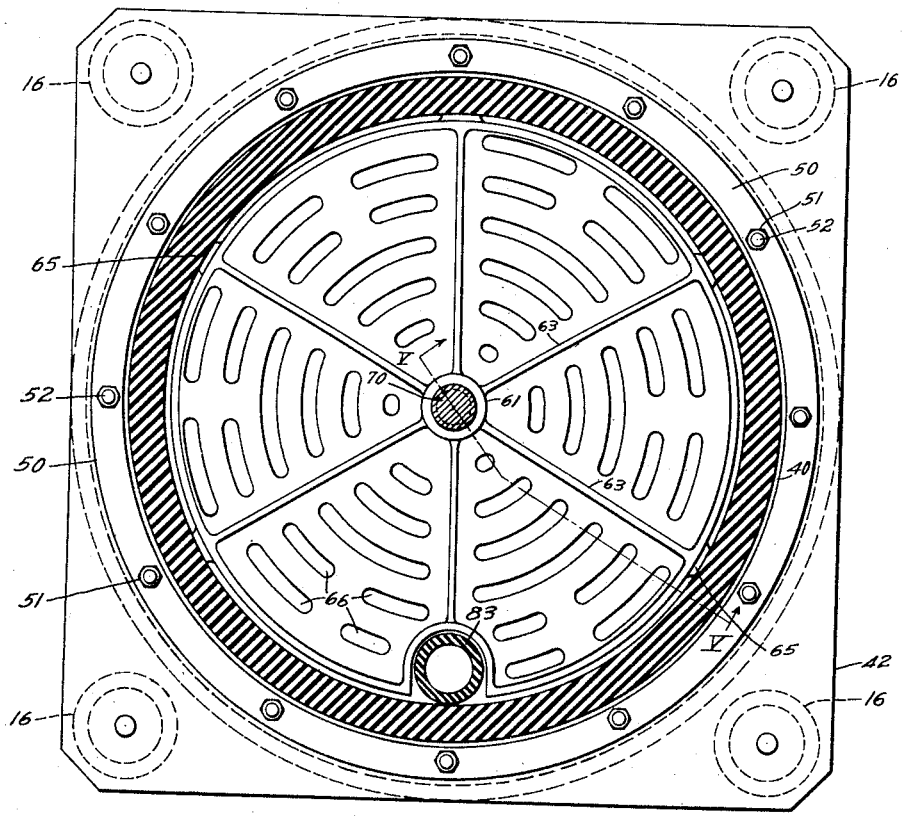
Fig. 4 is an enlarged section view along the line IV—IV of Fig. 1.
Figure 5:
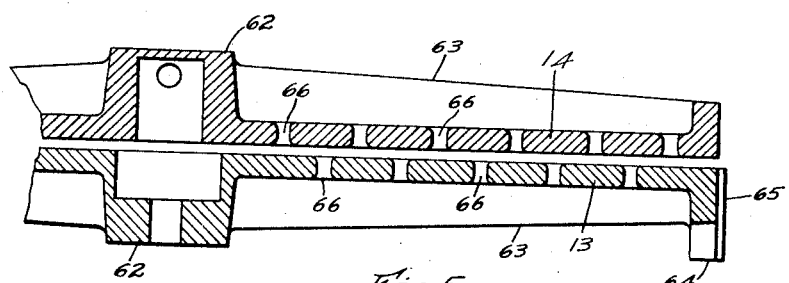
Fig. 5 is an enlarged section view along the line V—V of Fig. 4.

As clearly shown in Figs. 2, 4 and 5, the movable electrode 14 and the fixed electrode 13 may comprise similar castings, being generally in the nature of a circular disk having a hub portion 62, radial reenforcing ribs 63 which divide the disk into segments, support legs 64 and guide projections 65 about the periphery. As shown in detail in Figs. 4 and 5, the electrodes may be provided with a plurality of arcuate slots 66, the slots in successive segments being radially displaced. By making provision so that when the electrodes are in operating position, segments of the fixed and movable electrodes which are opposite each other contain slots which are radially displaced, it may be seen that if the electrolyte is forced to flow upward through these slots, the path of the electrolyte must necessarily be such that the adjacent surfaces of the two electrodes will be horizontally swept by a plurality of sheets of electrolyte, thus providing adequate cooling for the surfaces of the electrodes, and preventing the formation of hot spots and the boiling of the electrolyte therebetween.

Referring particularly to Figure 2, it may be seen that the fixed electrode 13 may be secured to the pan member 55 by means of a bolt 59 extending through the hub 62, and electrical connection made to the fixed electrode by external connection of conductors (not shown) to terminals 60, which are secured to the bottom of the pan 55. In this manner, it will be seen that all necessity for providing sealed insulating bushings for passing leads from the fixed electrode through the container, or the difficulties usually encountered in bringing out connections therefrom through the electrolyte itself, are obviated, and a simple, serviceable connection is secured. Likewise, by supporting the fixed electrode in such a manner that an annular chamber 61 is provided beneath the fixed electrode and the pan, and introducing a supply of cooled electrolyte therein, cooling of the electrode surfaces is greatly facilitated, as the electrolyte will then circulate upwardly through the opening 66 and out through the manifold whence it may be passed through a cooling device. In this connection it may be seen that the fixed electrode 13 and pan member 55 might, if desired, comprise an integral unit, having an internal electrolyte chamber into which the electrolyte could be introduced.

Referring again to Fig. 2, it may be seen that in a preferred form of my invention, the movable electrode 14 may be supported by means of a conducting support rod 70, which is secured in the hub 62 thereof, in any suitable manner, and which passes through an opening 72 in the support channel member 24, and is secured in engagement with a conducting bus 74 by means of clamp nuts 76 and 78 to form a star neutral connection. By providing for suspension of the movable electrode from the support member 24 and making the lower face of the nut 78 rounded, it may be seen that the electrode 14 may be pivotally suspended so that the guides 65 on the outer edges of the movable electrode may be maintained in engagement with the walls of the tube 40, in order to align the electrodes and prevent any misalignment of the support member 24 from changing the alignment of the electrodes.

By providing a separate inlet pipe 80 and outlet pipe 81 in connection with a face plate 82 of the electrolyte manifold 18, and utilizing an inlet guide tube 83 to introduce the electrolyte beneath the fixed electrode 13, a reasonably high resistance path may be maintained between the fixed electrodes 13 of the different phases, and an adequate supply of cooled electrolyte may be at all times introduced beneath the fixed electrode so as to provide an effective flow of the electrolyte through the cooling slots thereof, thus maintaining the temperature of the electrodes within the permissible range.

It may, therefore, be seen that by my invention, I have not only provided for greatly increasing the range of resistance which may be secured by smooth transition in a polyphase liquid slip regulating rheostat, but I have further provided a construction which greatly reduces the size and weight of the equipment, and facilitates the assembly and repair thereof.

Since certain changes may be made in the above construction and different embodiments of the invention may be made without departing from the spirit thereof, it is intended that all the matter contained in the accompanying description or shown in the drawings shall be considered as illustrative, and not in a limiting sense.

I claim as my invention:

1. A liquid containing rheostat having fixed and movable electrodes comprising, a base plate member, means including an open frame structure for supporting the base member, a tubular member of insulating material having a peripheral groove adjacent one end positioned about the electrode members and supported by the base member, means including a split key ring positioned in the groove and clamping means engaging the ring to secure the tubular member to the upper side of the base member, and a metallic pan member secured to the lower side of the base member to enclose the lower end of the tubular member and support the fixed electrode member.

2. The combination in a polyphase liquid containing rheostat for use with a polyphase circuit, of a support means, a plurality of separate containers equal to the number of phases of the circuit openly mounted on the support means, each of said containers functioning as an independent electrolyte retainer, a fixed electrode member positioned in each container for connection to a phase of the circuit, a movable electrode member associated with each fixed electrode member, a common rigid movable support member, rigid support means for pivotally supporting the movable electrode members from the support member, and common flexible conductor means associated with the support member for connecting the movable electrode members to provide a neutral connection for the circuit.

3. The combination in a polyphase liquid rheostat, of a relatively open structural frame, a plurality of separate containers supported by the frame to provide independent electrolyte containers each container having a fixed electrode member positioned therein adjacent the lower end, a movable electrode member associated with each fixed electrode member, means for supporting and electrically connecting the movable electrode members to provide a neutral connection for a polyphase system, means for connecting each fixed electrode to a separate phase of a polyphase system and means including a manifold connecting the containers at the upper ends and having insulating inlet conduits extending adjacent the lower ends thereof for effecting a circulation of the electrolyte in each container while restricting the interchange of electrolyte between containers.

4. A polyphase liquid containing rheostat comprising a structural frame, a plurality of base plates, a tube of insulating material supported on each base plate, a metallic pan member secured to each base plate to enclose the lower end of each tube and provide an electrolyte retainer for independently retaining the electrolyte, insulating means interposed between the base plates and the frame to support the retainers in a unit assembly, a fixed electrode member positioned within each electrolyte retainer and secured to the pan member, means for connecting the pan members to the different phases of a polyphase system, a movable electrode member positioned in each retainer, and support means connecting the movable electrode members to provide a neutral connection for the polyphase system and effect simultaneous movement of the movable electrode members.

5. A polyphase liquid rheostat comprising a frame, a plurality of separate independent electrolyte containers supported by the frame, each container having an electrical insulating side wall and a metallic bottom member for closing the lower end of the container, a movable electrode in each container, a stationary electrode secured to the bottom member, each electrode being provided with a series of perforations extending therethrough, the perforations in one electrode being offset and positioned laterally of the perforations in the other electrode whereby electrolyte passing through a perforation in one electrode must flow laterally before same may pass through a perforation in the other electrode, a conduit for passage of electrolyte secured to each side wall, a pipe connected to each conduit and extending to a point below the lower electrode, said pipe being formed of insulating material, and a second conduit secured to each said wall, said conduits providing an inlet and an outlet for each container.

WALTER SCHAELCHLIN.